United States Patent [19]

Inoue et al.

[11] Patent Number: 4,580,255

[45] Date of Patent: Apr. 1, 1986

[54] SERVO CIRCUIT FOR A SIGNAL REPRODUCING APPARATUS

[75] Inventors: Shigeki Inoue, Toyokawa; Takao Arai; Yukio Fukui, both of Yokohama; Takashi Takeuchi, Fujisawa; Harushige Nakagaki, Toyokawa; Masafumi Nakamura, Yokohama; Tatsuo Baba, Aichi, all of Japan

[73] Assignee: Hitachi, Ltd., Tokyo, Japan

[21] Appl. No.: 499,245

[22] Filed: May 31, 1983

[30] Foreign Application Priority Data

| May 31, 1982 | [JP] | Japan | 57-91251 |
| Jun. 4, 1982 | [JP] | Japan | 57-94812 |
| Jun. 4, 1982 | [JP] | Japan | 57-94808 |
| Jul. 21, 1982 | [JP] | Japan | 57-125634 |
| Aug. 30, 1982 | [JP] | Japan | 57-149313 |
| Nov. 12, 1982 | [JP] | Japan | 57-197468 |

[51] Int. Cl.⁴ .................... G11B 7/00; G11B 21/10
[52] U.S. Cl. .................... 369/44; 369/32; 369/48
[58] Field of Search .......... 358/342; 369/43–48, 369/50, 51, 111

[56] References Cited

U.S. PATENT DOCUMENTS

| 3,596,064 | 7/1971 | Markevitch et al. | 369/44 |
| 4,271,334 | 6/1981 | Yardy | 369/44 |
| 4,332,022 | 5/1982 | Ceshkovsky et al. | 369/44 |
| 4,338,682 | 7/1982 | Hosaka et al. | 369/44 |
| 4,340,950 | 7/1982 | Kosaka | 369/44 |
| 4,344,165 | 8/1982 | Akiyama | 369/44 |
| 4,376,956 | 3/1983 | Kelleher | 369/43 |
| 4,446,545 | 5/1984 | Van Dijk | 369/44 |
| 4,475,182 | 10/1984 | Hosaka | 369/45 |
| 4,497,047 | 1/1985 | Fujiie et al. | 369/45 |

FOREIGN PATENT DOCUMENTS

| 55-42304 | 3/1980 | Japan | 369/44 |
| 55-89949 | 7/1980 | Japan | 369/43 |

Primary Examiner—Donald McElheny, Jr.
Attorney, Agent, or Firm—Antonelli, Terry & Wands

[57] ABSTRACT

A servo circuit for a signal reproducing apparatus for reproducing signals from a record medium such as a disc utilizing an optical pickup, wherein a variable gain amplifier is arranged in a servo loop between a pickup and an actuator so that the pickup is caused to track a signal track in accordance with a servo error signal produced by the variable gain amplifier. A playback condition of a disc is discriminated by detecting the number of errors in a signal reproduced from a recorded signal on the disc by the pickup, and a gain of the variable gain amplifier is controlled by the discrimination output so that the variation of the servo error signal caused by a difference in reflectance between individual discs is eliminated and a loop gain appropriate to an individual disc is automatically set.

12 Claims, 36 Drawing Figures

F I G. 10
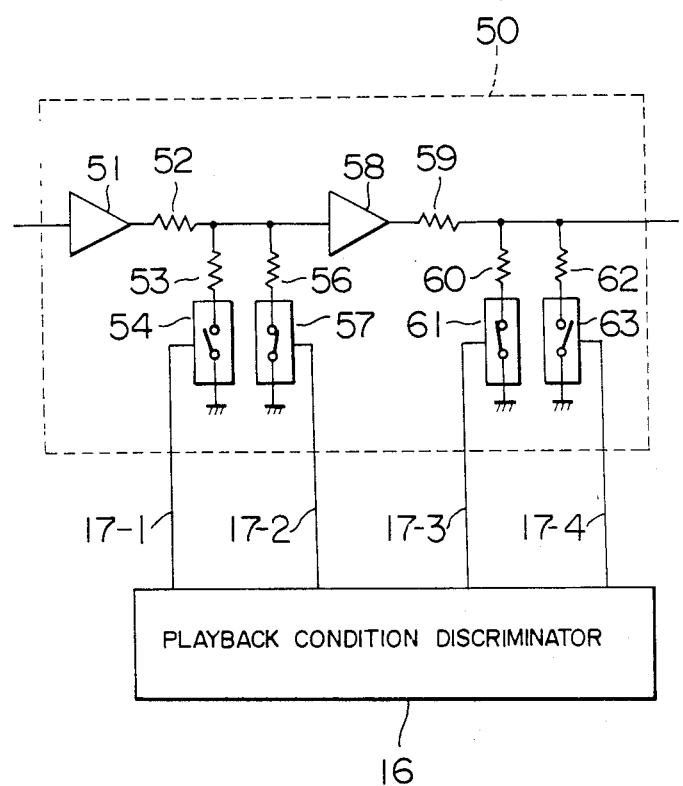

F I G. 19
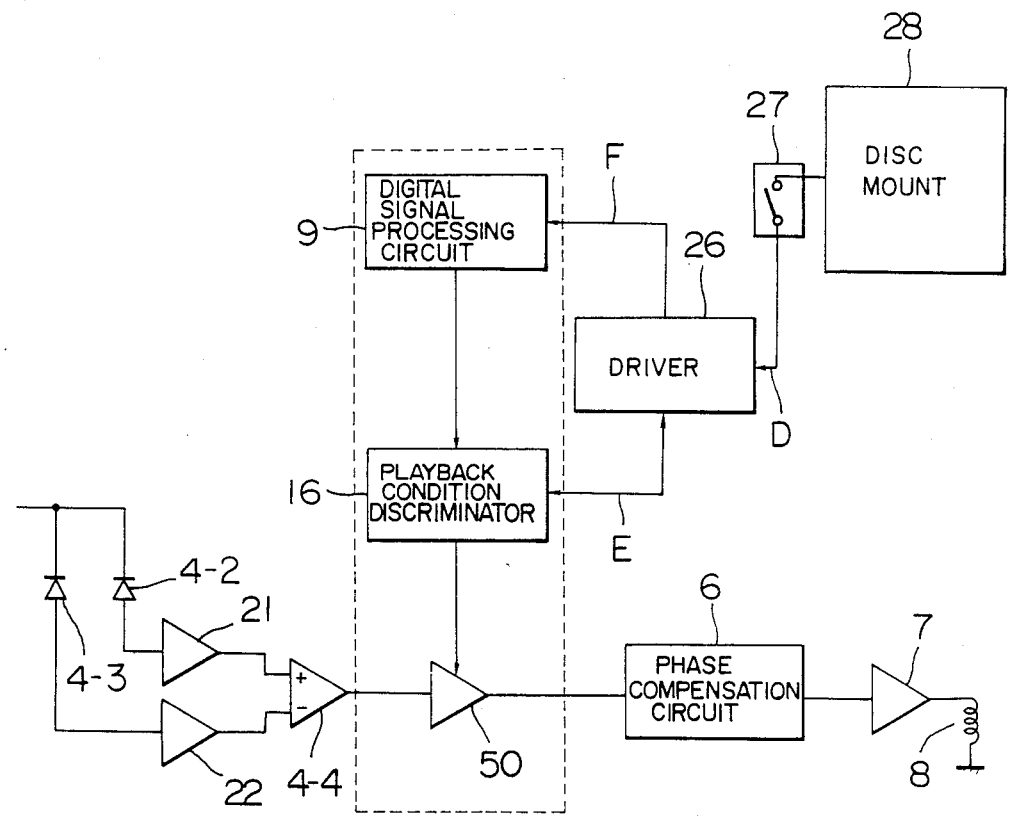
F I G. 20
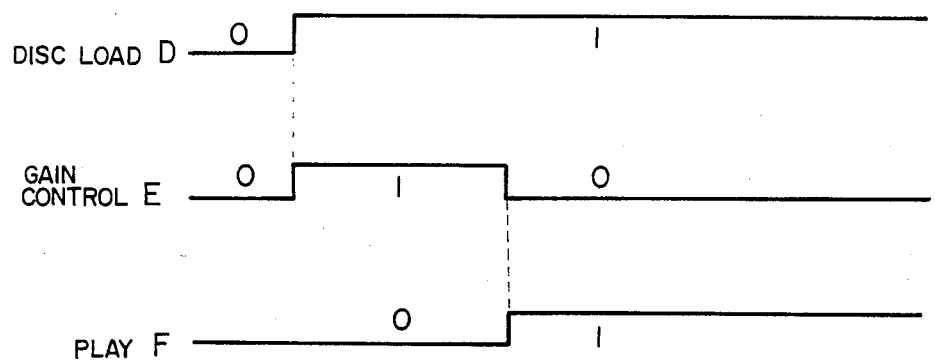

F I G. 32
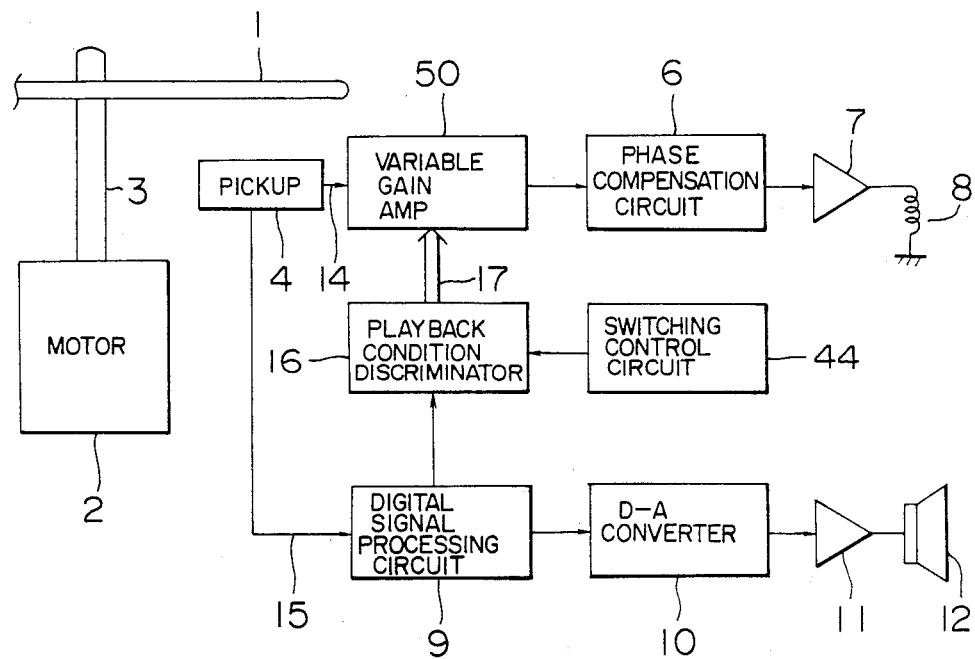
F I G. 33
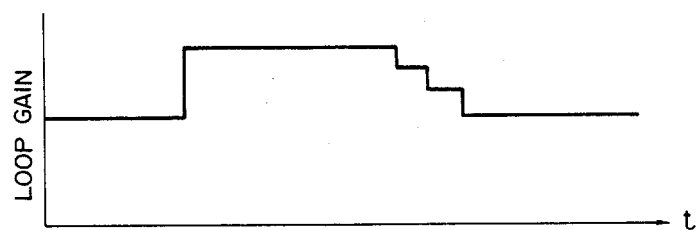
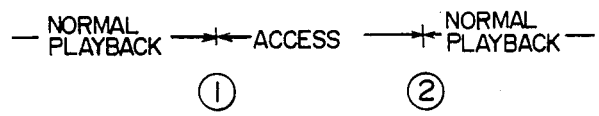

SERVO CIRCUIT FOR A SIGNAL REPRODUCING APPARATUS

The present invention relates to a servo circuit for a signal reproducing apparatus suitable for a pickup tracking servo of a digital audio disc and a video disc.

The digital audio disc and the video disc use an optical system or a contact needle system to record and play back signals. In any system, a pickup must track a signal track and hence a pickup tracking servo is essential.

FIG. 1 schematically shows a servo circuit of an optical disc signal reproducing apparatus.

A servo controlling error signal is detected from an optical disc 1 by a pickup 4 and it is fed back to an actuator coil 8 for driving the pickup 4 through an amplifier 5, a phase compensation circuit 6 and a driving amplifier 7 to form a servo loop so that the pickup 4 is caused to track a signal track.

In FIG. 1, the pickup 4 detects the servo control error signal as well as a recorded signal on the signal track, and the recorded signal detected is supplied to a signal processing circuit 9. An output from the digital signal processing circuit 9 is converted to an audio signal by a D-A converter 10 so that the recorded signal is reproduced as a sound through an audio amplifier 11 and a speaker 12. The disc 1 is rotated by a motor 2 and a motor shaft 3. A rotation speed control of the motor 2 is not explained here because it is not an essential portion of the present invention.

FIG. 2 shows an enlarged detailed diagram of a portion of the disc 1 and the pickup 4 shown in FIG. 1. An optical system is shown in a simplified form. In FIG. 2, numerals 13-0, 13-1 and 13-2 denote signal tracks of the disc 1 and areas between the signal tracks 13-0 and 13-1 and between the signal tracks 13-1 and 13-2 are guard bands between the signal tracks. The signal tracks have holes called pits formed therein as shown by broken lines on the signal track 13-1. For the sake of convenience, they are shown by two solid lines. The pickup shown in FIG. 2 is a three-spot pickup which has a light spot 4-1 for detecting the recorded information and light spots 4-2 and 4-3 for detecting the servo error signal. Those spots are moved in unison. Spot positions of the light spots 4-2 and 4-3 are shifted oppositely in a direction of a track width with respect to a center of the light spot 4-1 by approximately one half of the track width, and the center of the light spot 4-1 and the centers of the light spots 4-2 and 4-3 are displaced from each other as viewed in a longitudinal direction of the track.

Those three light spots 4-1, 4-2 and 4-3 are irradiated to the disc 1 and intensities of reflected lights are detected by photo-detectors as current signals. In FIG. 2, the photo-detectors are represented by the respective light spots. An output of the light spot (photo-detector) 4-1 is converted to a voltage signal by a current-voltage converter 4-5 and the voltage signal is supplied to the signal processing circuit 9 of FIG. 1 through an output line 15. Outputs from the light spots (photo-detectors) 4-2 and 4-3 are differentially supplied to a current-voltage converter 4-4 which produces the servo error signal on an output line 14. A principle of the detection of the servo error signal is explained below with reference to FIG. 3.

Assuming that the light spot 4-1 is initially at the center of the signal track 13-1 shown by the solid lines in FIG. 3(l), the light spots 4-2 and 4-3 partially ride on the signal track 13-1 by the same amount and the remaining areas of the light spots 4-2 and 4-3 (which are also equal in amount) ride on the guard bands. Thus, the difference between the outputs of the photo-detectors 4-2 and 4-3 is zero as shown in FIG. 3(3)(h). If the light spot 4-1 is displaced rightward from the center of the track 13-1 to a position shown by a broken line in FIG. 3(l), all areas of the light spot 4-2 ride on the guard band while the light spot 4-3 is at the center of the signal track 13-1. As a result, the differential signal assumes a positive maximum as shown in FIG. 3(3)(i). Similarly, if the light spot 4-1 is displaced leftward from the center of the signal track 13-1 to a position shown by a chain line in FIG. 3(l), the differential signal assumes a negative maximum as shown in FIG. 3(3)(j). As seen from the above description, the error signal as shown in FIG. 3(3) is produced as the light spot 4-1 is displaced. The error signal is supplied to the actuator coil 8 of FIG. 1 through the amplifier 5, the phase compensation circuit 6 and the driving amplifier 7 so that an object lens carried by the actuator is served in the direction of the track width to bring the light spot 4-1 to the center of the track 13-1. Since the error signal is detected as a difference between signal levels of a mirror surface level $A_2$ and an envelope B as shown in FIG. 3(2)(k), the magnitude of the error signal is affected by a reflection factor of the disc (height A), a modulation factor $(A-B)/A$ and a cross-talk $(A-C)/(A-B)$ and a detection sensitivity to the error signal significantly fluctuates.

An oscillation frequency, in the tracking direction, of the actuator having the tracking coil 8 in the servo circuit of FIG. 1 has a transfer characteristic as shown in FIGS. 4A and 4B. FIG. 4A shows an amplitude displacement response (left and right swing) versus an applied voltage or a supply current to the actuator coil 8, and shows that the response decreases along a line of $-12$ dB/oct as the voltage or current increases. In FIG. 4A, $f_o$ is a cutoff frequency, and $f_h$ is a sub-resonance point which is undesirable one but unavoidable. FIG. 4B shows a phase characteristic. The phase characteristic depends on Q at the cutoff frequency $f_o$ of FIG. 4A and the phase abruptly change from 0 to nearly $\pi$ radian at the cutoff frequency. The phase characteristic naturally has a disturbance at the sub-resonance point $f_h$.

A loop gain and a phase characteristic of the pickup servo which uses the actuator having the characteristic of FIGS. 4A and 4B are shown in FIGS. 5A and 5B, respectively. In FIG. 5A, a curve (c) shows an open loop gain by a design. An area from (l) to (m) on the curve (c) results from the compensation by the phase compensation circuit 6 of FIG. 1 which serves to reduce a phase (phase margin) angle at a point of an open gain of 0 dB below $\pi$ radian as shown in FIG. 5B. An area shown by a dotted line on the curve (c) of FIG. 5A shows an imaginary curve when the phase compensation is not carried out.

It has been described above that the detection sensitivity of the servo error signal significantly fluctuates depending on the reflection coefficient of the disc. When the discs are not uniform, the curve (c) of the original design may be shifted to a curve (d) or curve (e). For the curve (d), the peak at the sub-resonance point exceeds 0 dB and no gain margin is present. For the curve (e), the phase margin reaches zero when the 0 dB line is crossed and the operation becomes unstable. Accordingly, not all discs can be reproduced.

It is an object of the present invention to provide a servo circuit for a signal reproducing apparatus which stably reproduces a disc without regard to variation of the discs.

In order to achieve the above object, in accordance with the present invention, a variable gain amplifier is arranged in a servo loop between a pickup and an actuator, and a playback condition of a disc is discriminated by detecting the number of errors in a signal reproduced from a recorded signal on the disc by the pickup, and a gain of the variable gain amplifier is controlled by the discrimination output so that a loop gain appropriate to a particular disc is set.

The present invention will now be explained in conjunction with the accompanying drawings, in which:

FIG. 10 is a detailed circuit diagram of a variable gain amplifier of the present invention;

FIG. 19 is a circuit diagram of a sixth embodiment of the present invention;

FIG. 20 is a timing chart for disc loading, gain control and playback;

Figure 30:
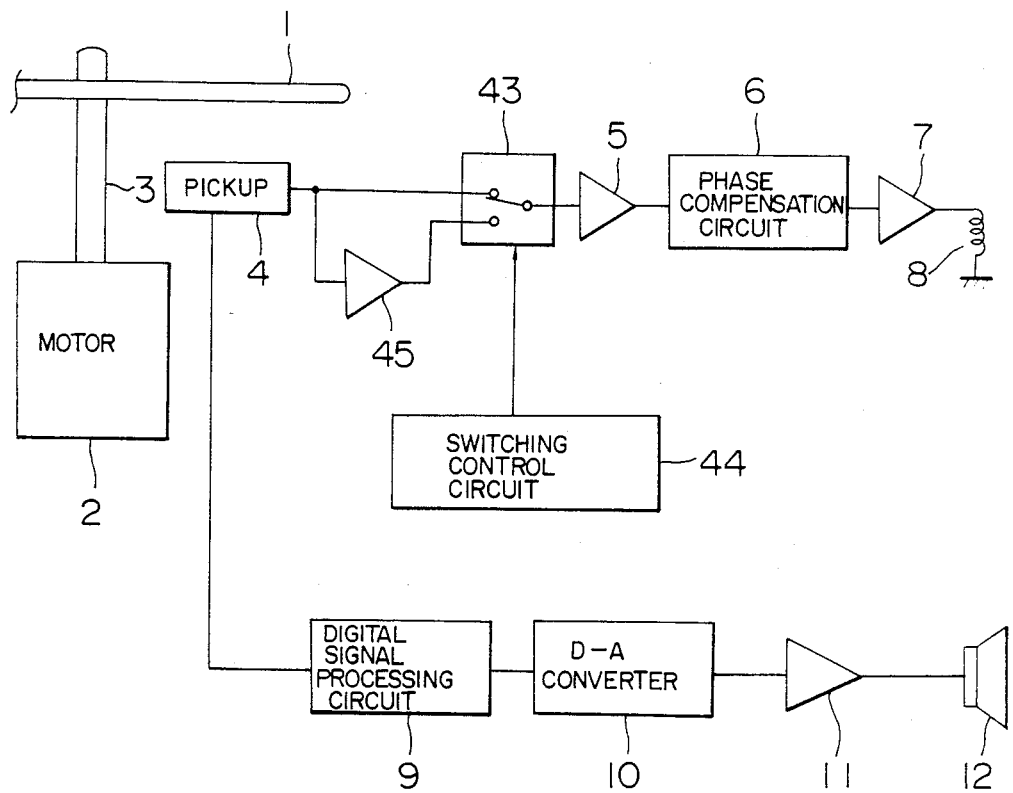
FIG. 30 is a circuit diagram of a twelfth embodiment of the present invention.
Figure 31:
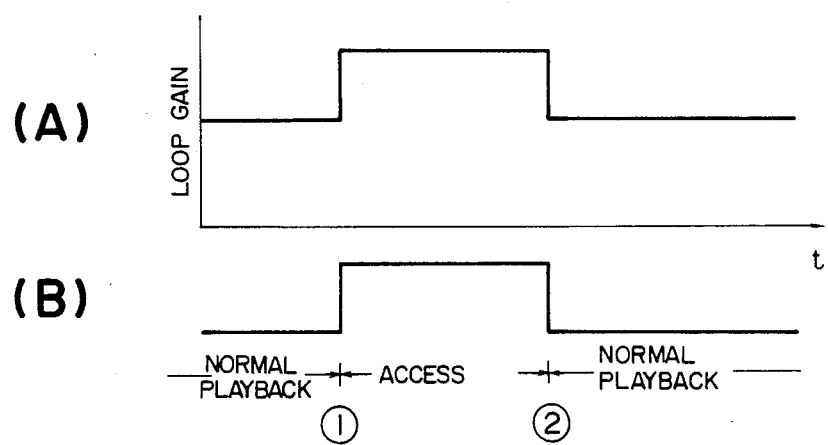

FIG. 31 consisting of (A) and (B), shows waveforms for explaining the operation of FIG. 30;

FIG. 32 is a circuit diagram of a thirteenth embodiment of the present invention; and FIG. 33 shows waveforms for explaining the operation of FIG. 32.

Figure 1:
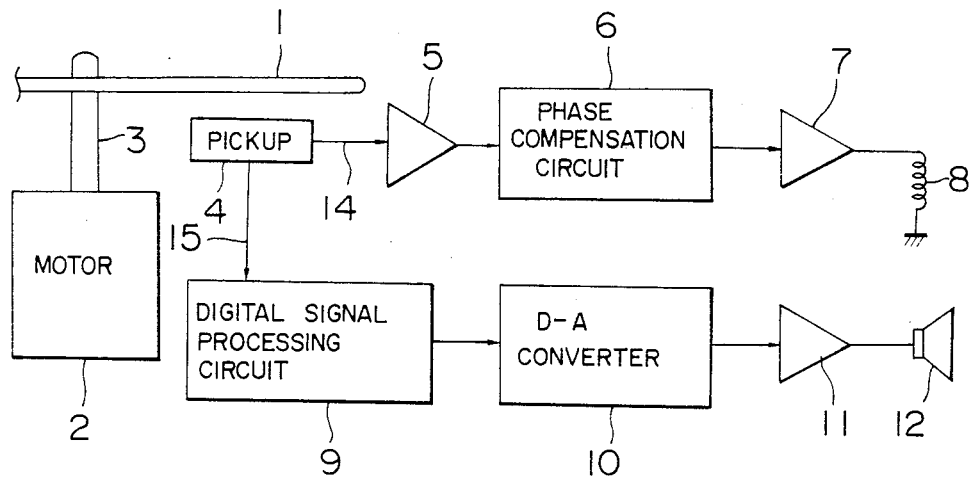
FIG. 1 is a schematic diagram of a servo circuit for an optical disc reproducing apparatus.
Figure 6:
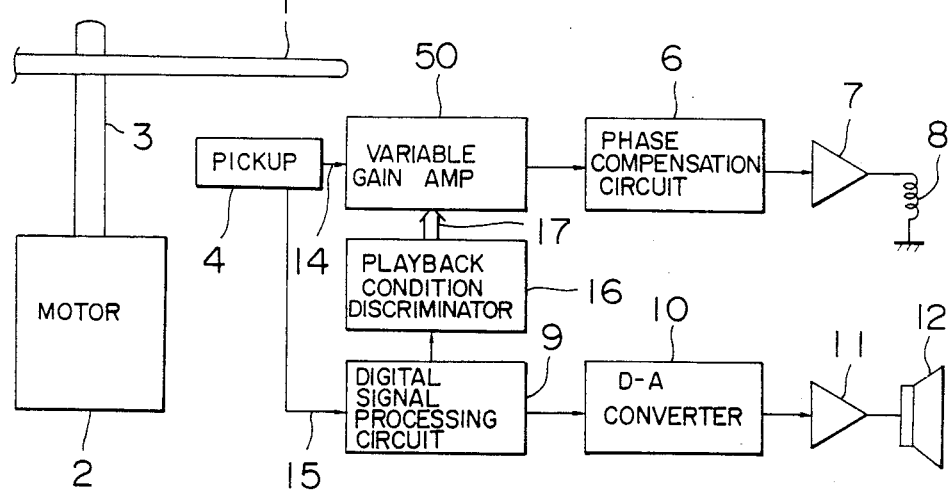
FIG. 6 is a block diagram of a first embodiment of the present invention.

FIG. 6 is a block diagram of a first embodiment of the present invention. In FIG. 6, the amplifier in FIG. 1 is replaced by a variable gain amplifier 50, and the number of errors per predetermined time period in the signal produced by the digital signal processing circuit 9 is detected by a playback condition discriminator 16 and the gain of the variable gain amplifier 50 is controlled through a control line 17 to reduce the number of errors. The like numerals to those in FIG. 1 designate the like elements.

Figure 7:
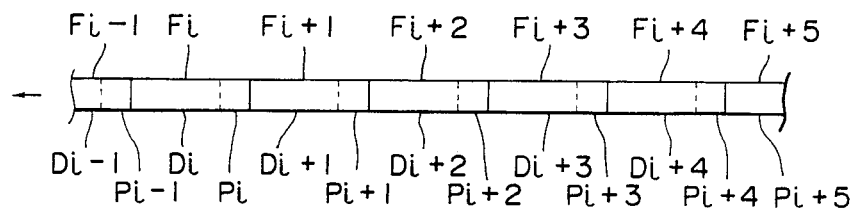
FIGS. 7, 8 and 9 are diagrams for explaining the operation of the present invention.

When the signal recorded on the disc is digital information, it is common to record combinations of data and parity $(D_{i-1}, P_{i-1})$, $(D_i, P_i)$, ..., $(D_{i+5}, P_{i+5})$ as frames $F_{i-1}$, $F_i$, ..., $F_{i+5}$, respectively, as shown in FIG. 7. Thus, the digital signal processing circuit 9 checks the data by the parity signals in the respective frames to determine if the data are in error or not. The number of errors per predetermined time period can be determined by counting the numbers of errors in the respective frames for the predetermined time period.

Figure 8:
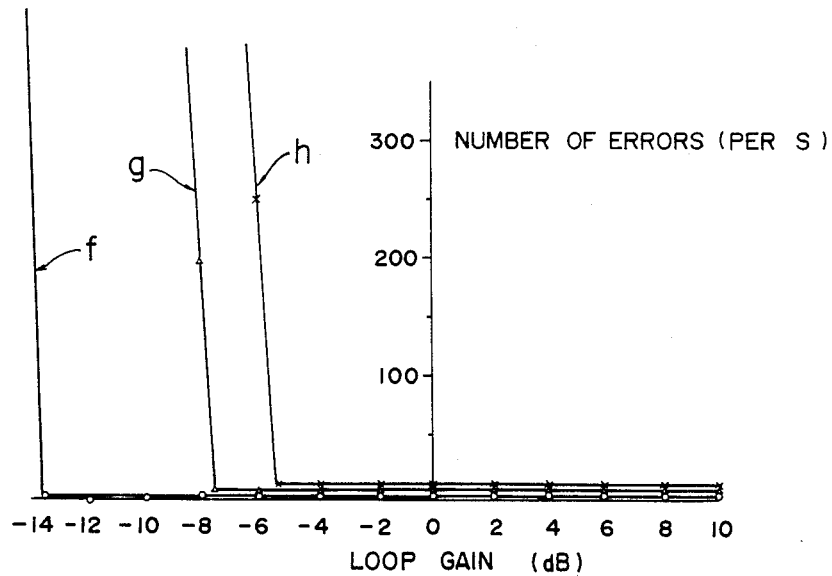

FIG. 8 shows measured data of the number of errors in the playback of the disc for different relative loop gains. A curve f is for a small eccentricity disc, a curve h is for a large eccentricity disc, and a curve g is an intermediate eccentricity disc. In a region of a low gain on the left of an inflection point at which the number of errors abruptly increases, the recorded signal cannot be exactly reproduced.

Since a strong correlation exists between the tracking loop gain and the number of errors as seen from FIG. 8, the gain of the variable gain amplifier 50 of FIG. 6 is controlled by the playback condition discriminator 16, and the inflection point at which the number of errors abruptly increases is searched and the gain is increased by a constant value when the inflection point is detected.

Figure 9:
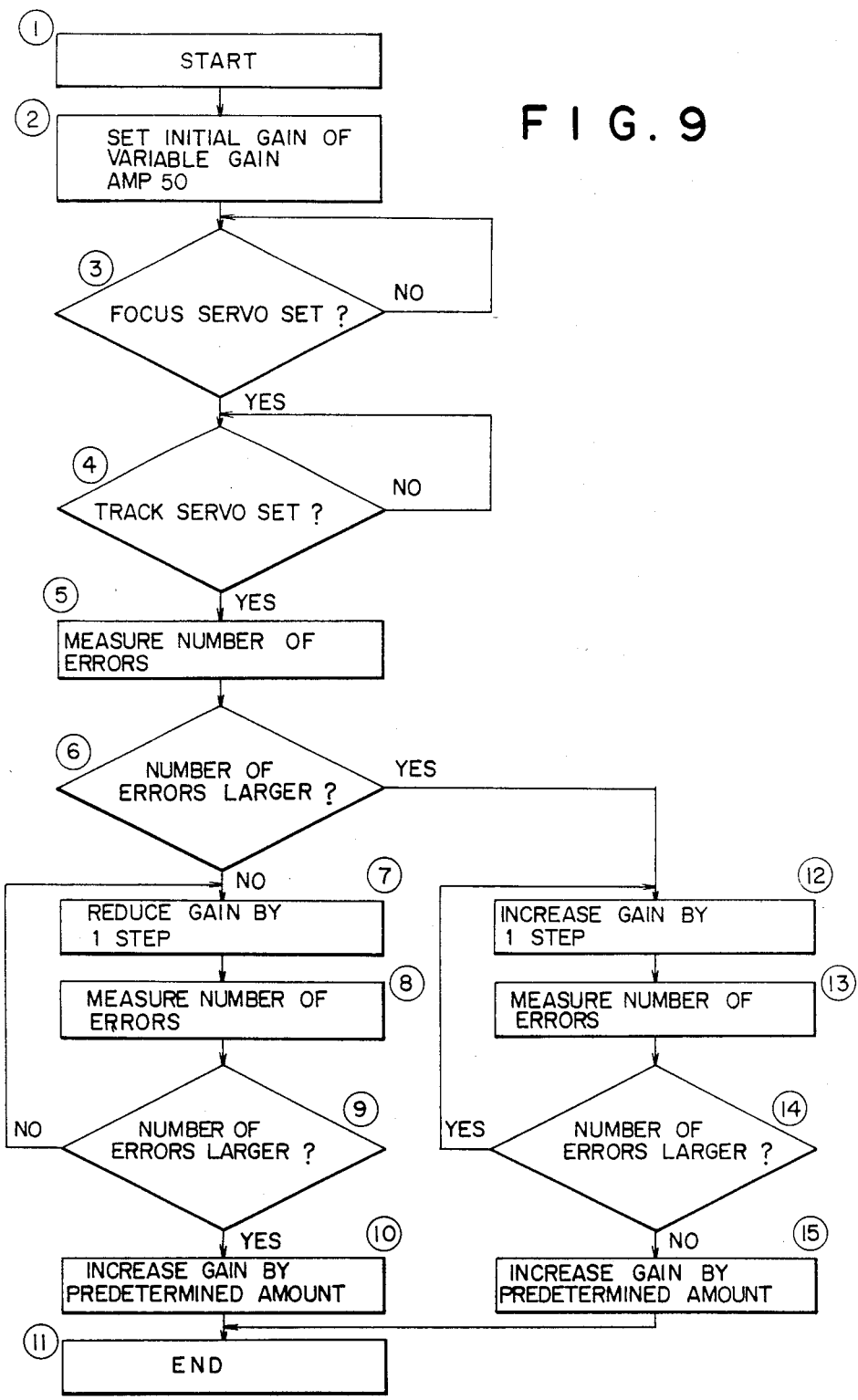

The playback condition discriminator 16 of FIG. 6 discriminates the playback condition by a process shown in a flow chart of FIG. 9. In FIG. 9, the playback condition discrimination processing is started at a step ①, and the gain of the variable gain amplifier 50 is initialized at a step ②. The process then waits for the setting of the focus servo and the track servo at steps ③ and ④, then it proceeds to a step ⑤. The number of errors at the initial gain is measured by the digital signal processing circuit 9 at the step ⑤, and the number of errors is compared with a predetermined number at a step ⑥. If the number of errors is smaller than the predetermined number, the gain of the variable gain amplifier 50 is decreased by one step at a step ⑦, the number of errors with the reduced gain is measured at a step ⑧, and the number of errors is compared at a step 9 . If the number of errors is smaller, the process again returns to the step ⑦ and repeats the steps ⑧ and ⑨. If the number of errors is larger at the step ⑨, it means the detection of the rising point in FIG. 8 so that the playback condition is discriminated. Then, the gain is increased by a predetermined amount at the point where the error condition was deteriorated at a step ⑩, and the process ends at a step ⑪. On the other hand, if the number of errors is larger at the step ⑥, it means that the gain is too low, and the gain is increased at a step ⑫ and similar steps to the steps ⑦, ⑧ and ⑨ are carried out at steps ⑫, ⑬ and ⑭ so that the playback condition is discriminated. The gain is increased by the predetermined amount at a step ⑮ like in the step ⑩ and the process ends at the step ⑪. By measuring the number of errors in the steps ⑤, ⑧ and ⑬ for a longer period than one revolution period of the disc, the affect by the eccentricity of the disc can be taken into consideration. It should be understood that when the playback condition discriminator 16 having the flow shown in FIG. 9 is constructed by a microcomputer, a higher degree of decision can be made and the condition can be discriminated more exactly.

FIG. 10 shows an embodiment of the variable gain amplifier 50. It comprises buffer amplifiers 51 and 58, resistors 52, 53, 56, 59, 60 and 62, and switches 54, 57, 61 and 63. Control signals 17-1–17-4 from the playback condition discriminator 16 are supplied to the switches 54, 57, 61 and 63, which are turned on and off to control the gain.

Figure 11:
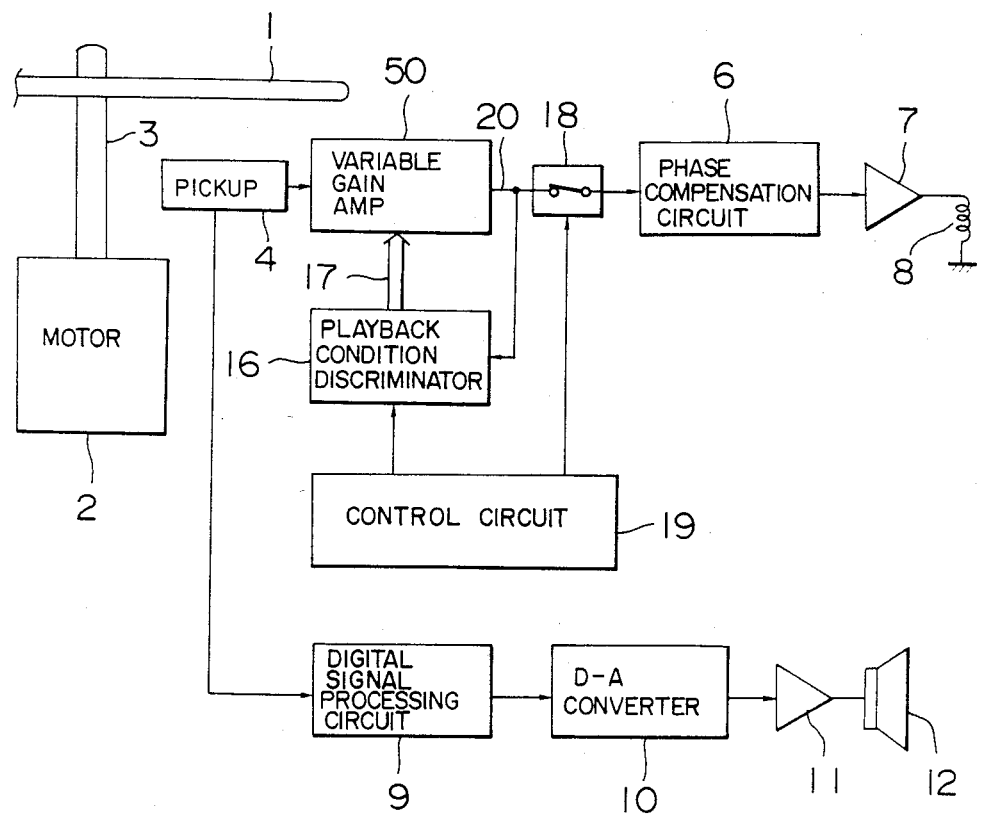
FIG. 11 is a block diagram of a second embodiment of the present invention.
Figure 12:
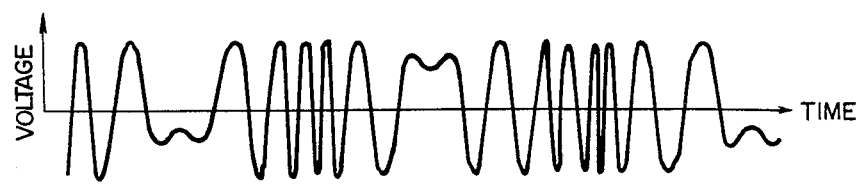
FIG. 12 is a chart for explaining the operation of the embodiment of FIG. 11.

FIG. 11 shows a second embodiment of the present invention. FIG. 11 shows an example for discriminating the playback condition by the output level of the variable gain amplifier 50. In FIG. 11, the like numerals to those in FIG. 1 designate the like elements, except the playback condition discriminator 16, the switch 18 and the control circuit 19. It is normally difficult to completely eliminate the eccentricity of the disc 1. Thus, prior to the playback of the disc 1, the switch 18 is turned off (that is, the servo loop is opened) by the control circuit 19. As a result, the pickup 4 intersects the signal track because of the eccentricity of the disc and hence the servo error signal shown in FIG. 12 is produced at the output terminal 20 of the variable gain amplifier 50. Thus, the amplitude of the servo error signal which depends on the disc 1 can be detected. Accordingly, the variation of the servo error signals is determined and the playback condition is discriminated.

The variation of the servo error signals of the disc 1 can be absorbed by controlling the gain of the variable gain amplifier 50 by the playback condition discriminator 16 to maintain the amplitude of the output 20 of the variable gain amplifier 50 at a constant level. Accordingly, by closing the switch 18 by the control circuit 19 after the above processing, a servo system of a constant loop gain is attained without regard to the disc variation. This method is also applicable to an analog recorded signal.

Figure 13:
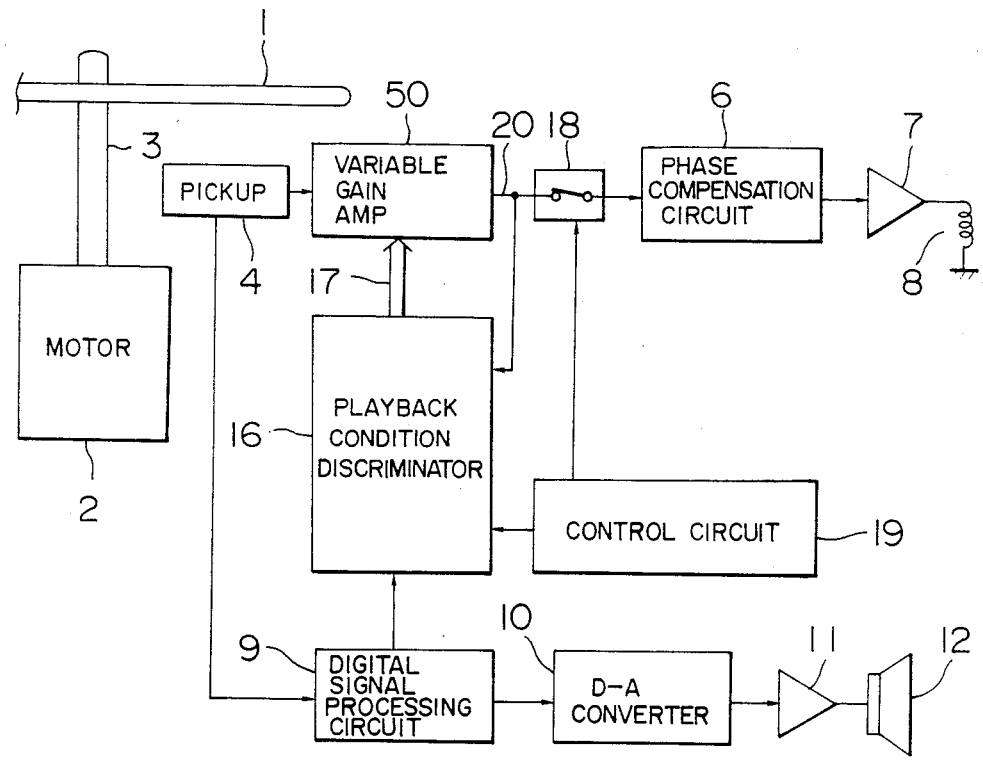
FIG. 13 is a block diagram of a third embodiment of the present invention.

FIG. 13 shows a third embodiment of the present invention. It differs from the embodiments of FIGS. 6 and 11 in that the playback condition discriminator 16 discriminates the playback condition by the servo error signal at the output 20 of the variable gain amplifier 50 and the number of errors from the digital signal processing circuit 9. In the present embodiment, the affects by both the variation of the servo error signals and the variation of the eccentricities of the discs 1 can be finely controlled so that the disc can always be reproduced at an optimum condition.

It is not so long when products which use a high servo technique such as the digital audio discs and the video discs are marked to general users as home entertainment products, but it is expected that the quality of the discs as mass-produced products varies in a wide range.

However, according to the present invention, even if the track loop gain varies by the variation of the reflection coefficient of the disc, the loop gain is automatically set to a point which does not result in the increase of the error and hence the influence by the variation of the reflection coefficient of the disc can be significantly reduced.

Since the control is such that the loop gain is lowered to the point that does not result in the increase of the error, a noise of the actuator due to the leakage-in of the digital signal component is also reduced.

By employing the present system, it is possible to set the servo loop gain depending on the application such as stationary use or vehicle installation use.

While the track servo of the disc reproducing apparatus has been explained, the same is applicable to focus servo and the application of the present invention is not limited to the disc reproducing apparatus but the present invention is applicable to any servo system which can discriminate the playback condition or the operation condition.

Figure 2:
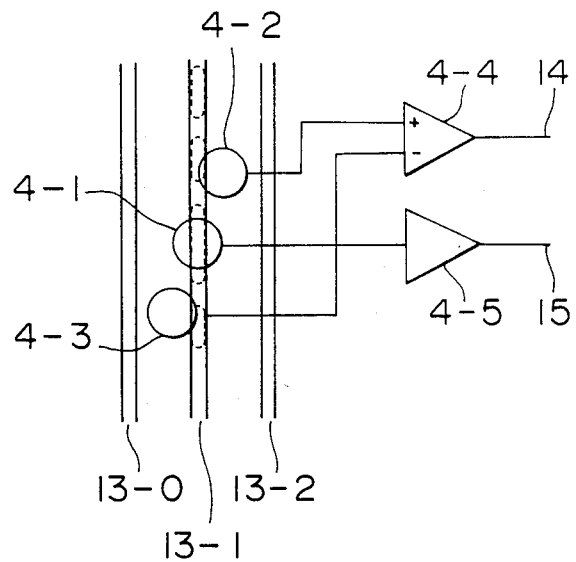
FIGS. 2 and 3 illustrate a principle of the detection of a servo error signal.
Figure 3:
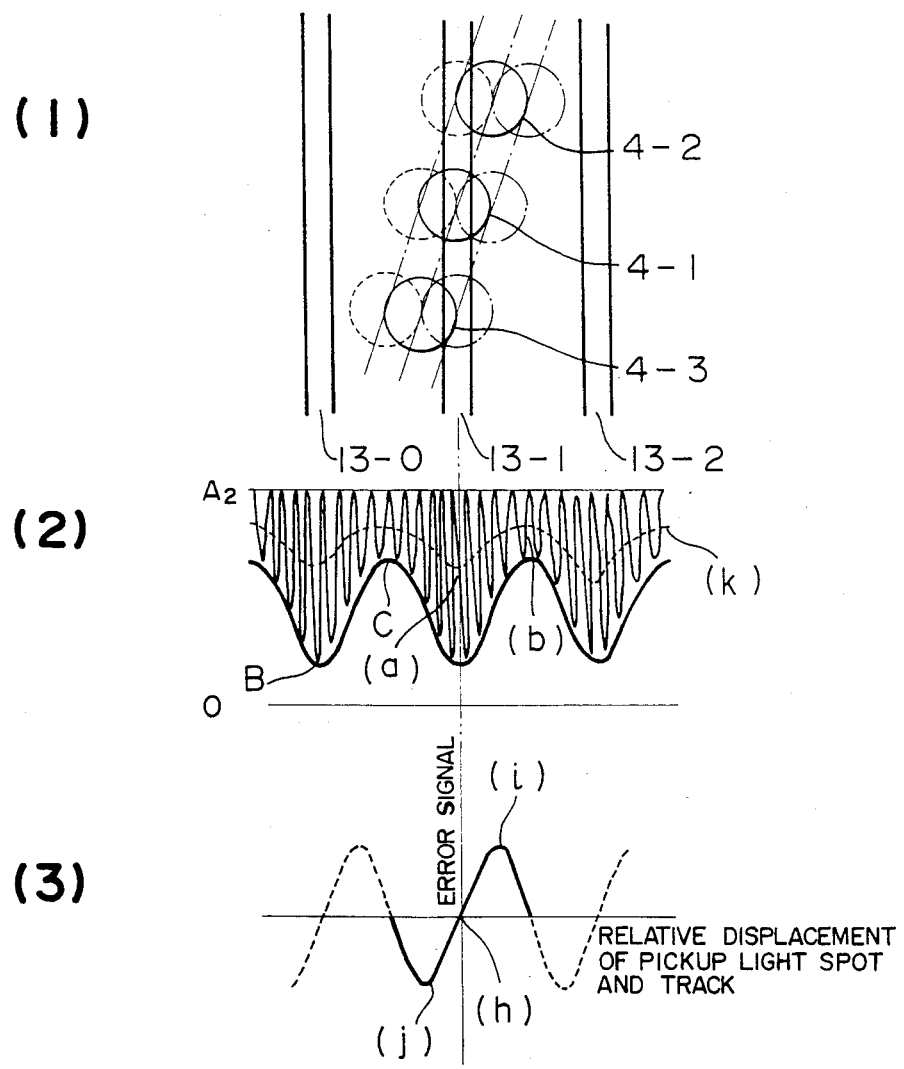
Figure 4A:
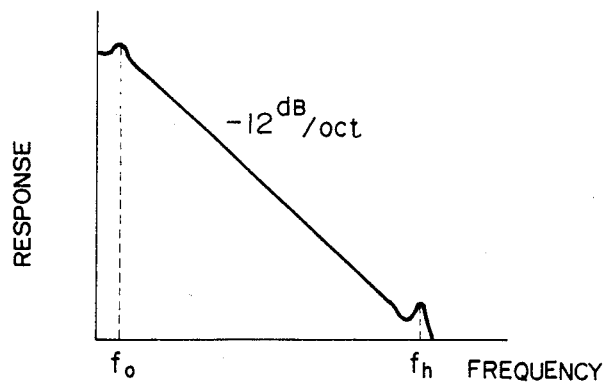
FIGS. 4A, 4B, 5A and 5B illustrate servo loop characteristics.
Figure 4B:
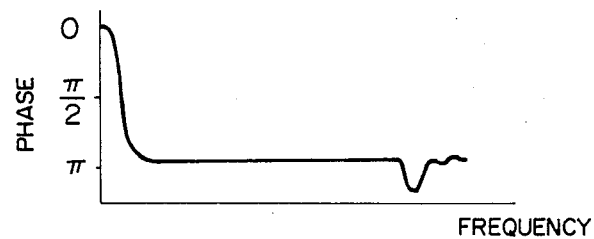
Figure 5A:
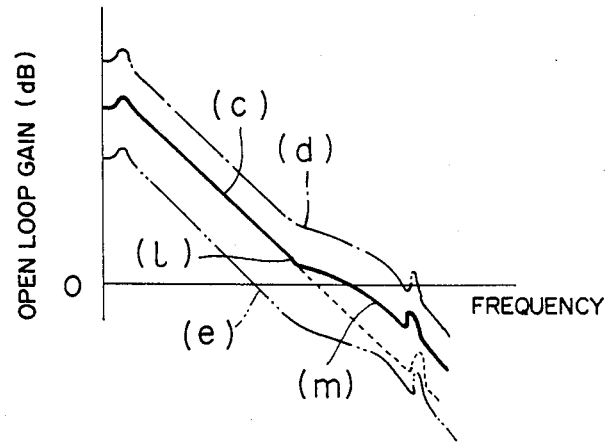
Figure 5B:
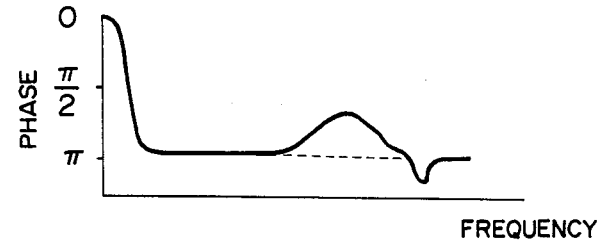
Figure 14:
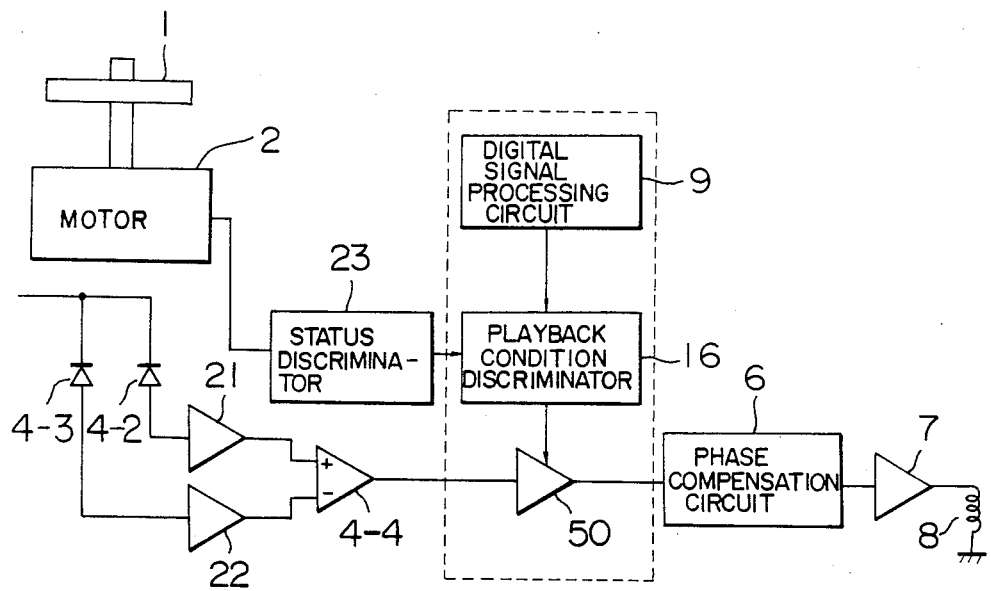
FIG. 14 is a circuit diagram of a fourth embodiment of the present invention.

FIG. 14 shows a fourth embodiment of the present invention. In FIG. 14, numerals 21 and 22 denote current-voltage converters and numeral 23 denotes a status discriminator for detecting the rotation speed of the disc motor 2. The like numerals to those in FIGS. 2 and 6 designate the like or equivalent elements.

The characteristic of FIG. 8 is obtained when the rotation of the disc motor is normal and the digital signal is correctly reproduced. If the gain control is started at a large error condition in which the digital signal cannot be correctly reproduced, the tracking loop gain may be set to a high value.

In the present embodiment, the rotation speed of the disc motor 2 is monitored by the status discriminator 23 and the gain control operation of the playback condition discriminator 16 is started by the control signal from the status discriminator 23 which is produced when the rotation of the disc motor 2 has reached the normal state.

Figure 15:
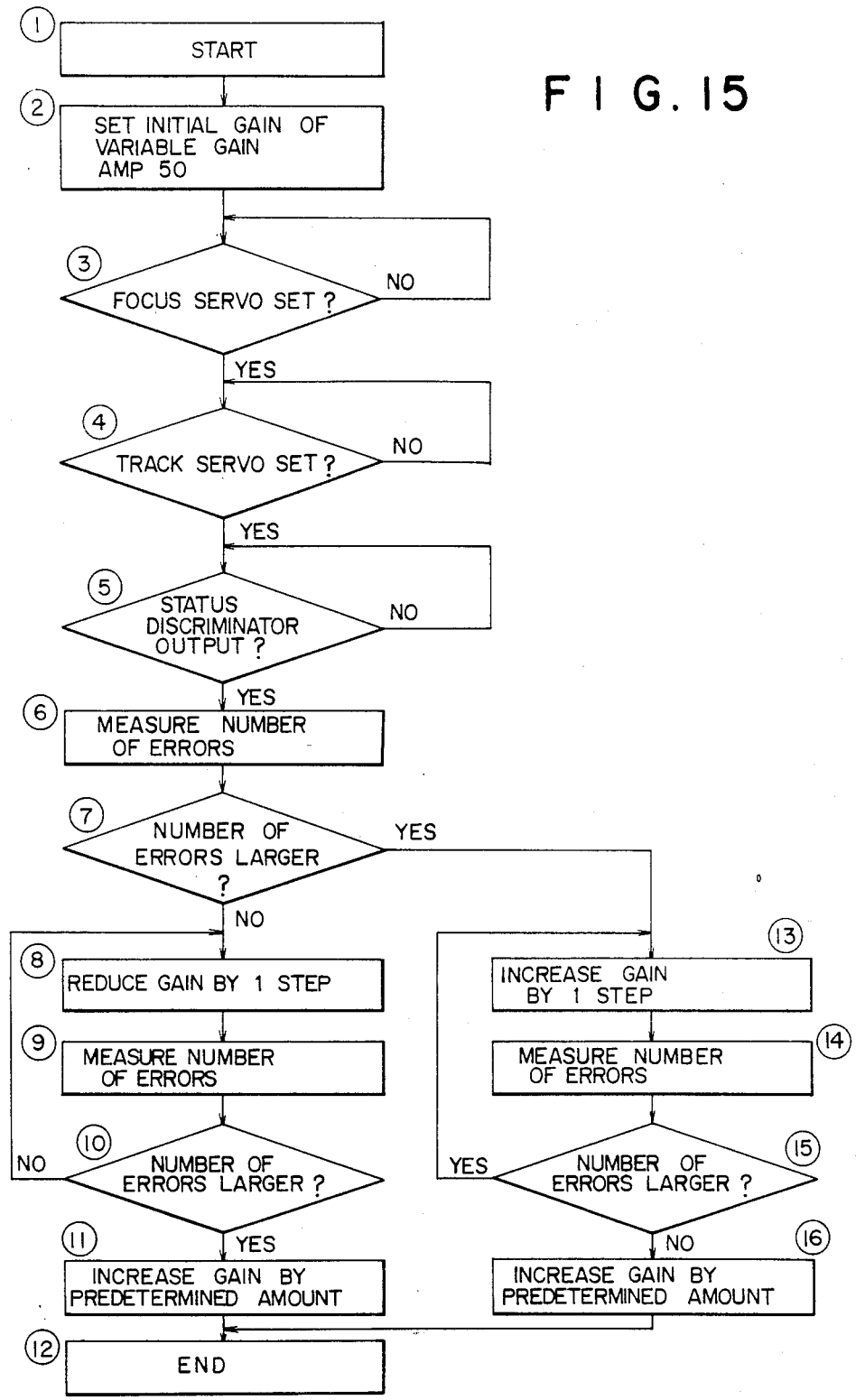
FIG. 15 illustrates the operation of FIG. 14.

Referring to FIG. 15, an example of processing flow when a microprocessor is used as the playback condition discriminator 16 is explained to illustrate the gain control operation. The microprocessor 16 comprises a ROM (read-only memory) which contains an operation program, a CPU (central processing unit) for carrying out an operation in accordance with the program and a RAM (random access memory) for writing and reading data in the course of the operation of the CPU.

When a power of the disc player is turned on at a step ①, the microprocessor 16 stores in the RAM a signal to set the gain of the variable gain amplifier 50 to 0 dB (initial value) at a step ②. Then, the process waits for setting of the focus servo and the track servo in steps ③ and ④, and then goes to a step ⑤. In the step ⑤, the presence or absence of the signal from the status discriminator 23, that is, whether the rotation of the disc motor 2 has reached the normal state or not, is checked, and if the rotation speed is normal, the process goes to a step ⑥ to start the gain control of the track loop. In the step ⑥, the number of errors for each track revolution in the signal supplied from the digital signal processing circuit 9 is measured. Thereafter, the gain is set in the same manner as in FIG. 9.

While the embodiment of FIG. 14 uses the independent status discriminator to detect whether the rotation speed of the disc motor has reached the normal speed or not, the present invention is not limited thereto. For example, in a DAD player which carries out a constant linear velocity (CLV) servo, a synchronizing signal recorded on the disc may be used.

While the present embodiment starts the gain control when the control signal is produced by the status discriminator, the present invention is not limited thereto. When the number of errors immediately after the rotation of the disc motor has reached the normal state includes a large transient variation, the gain control may be started with a certain delay (a delay time being set between the steps ⑤ and ⑥ in FIG. 15) after the generation of the control signal from the status discriminator.

Accordingly, in the present embodiment, after the rotation of the disc motor has reached the normal state so that the digital signal can be correctly reproduced, the gain control is started while the number of errors is discriminated. Therefore, the miscontrol due to the instability of the rotation speed of the disc motor is avoided and the tracking servo circuit which exactly controls the gain, has a small actuator noise and automatically absorbs the variation of the disc sensitivity, can be attained.

Figure 16:
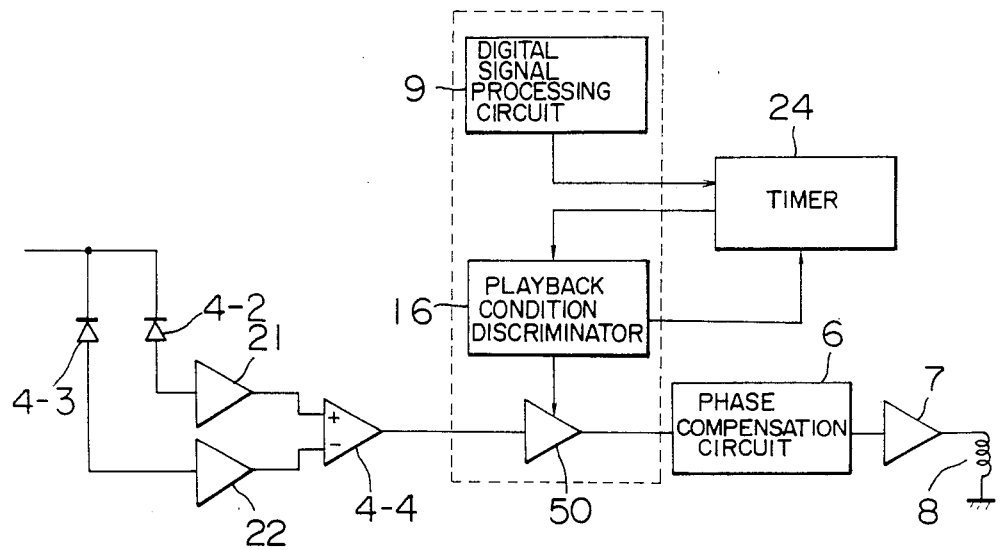
FIG. 16 is a circuit diagram of a fifth embodiment of the present invention.

FIG. 16 shows a fifth embodiment of the present invention. In FIG. 16, numeral 24 denotes a timer. The like numerals to those in FIGS. 2 and 6 designate the like or equivalent elements.

When the number of errors transiently varies significantly immediately after the gain of the variable gain amplifier has been changed stepwise, or when the gain change is not reflected to the change of the number of errors without time delay, a variation may occur in the gain setting of the tracking loop.

In the present embodiment, the timer 24 is provided to inhibit the detection of the number of errors for a certain period each time when the gain of the variable gain amplifier 50 is changed by the playback condition discriminator 16, and the number of errors is discriminated after the certain period, that is, after the servo system has been stabilized to allow the correct reproduction of the digital signal.

Figure 17A:
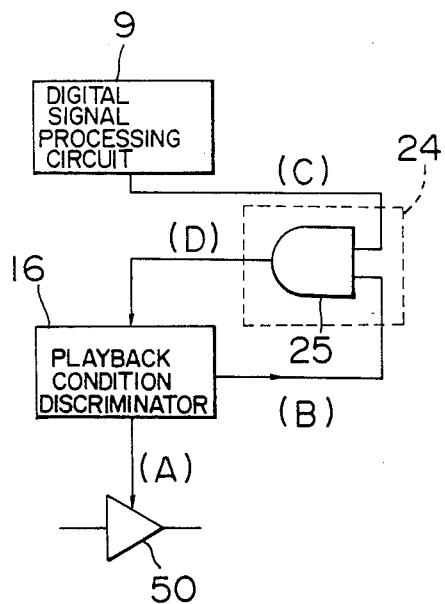
FIGS. 17A and 17B show an embodiment of a timer unit.
Figure 17B:
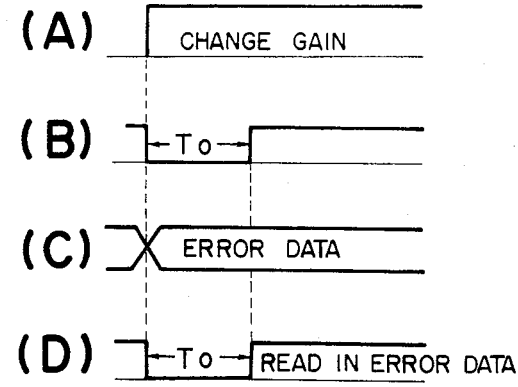

The timer 24 may be constructed by a logical gate (AND gate) 25 shown in FIGS. 17A and 17B. The gain of the variable gain amplifier 50 is changed by the playback condition discriminator 16 (signal A) and, at the same time, a signal B which is "LOW" for a predetermined time $T_0$ is produced, and the signal B and an error data signal C are ANDed. Thus, the read-in of the error data is inhibited for the predetermined time $T_0$ after the gain has been changed.

Figure 18:
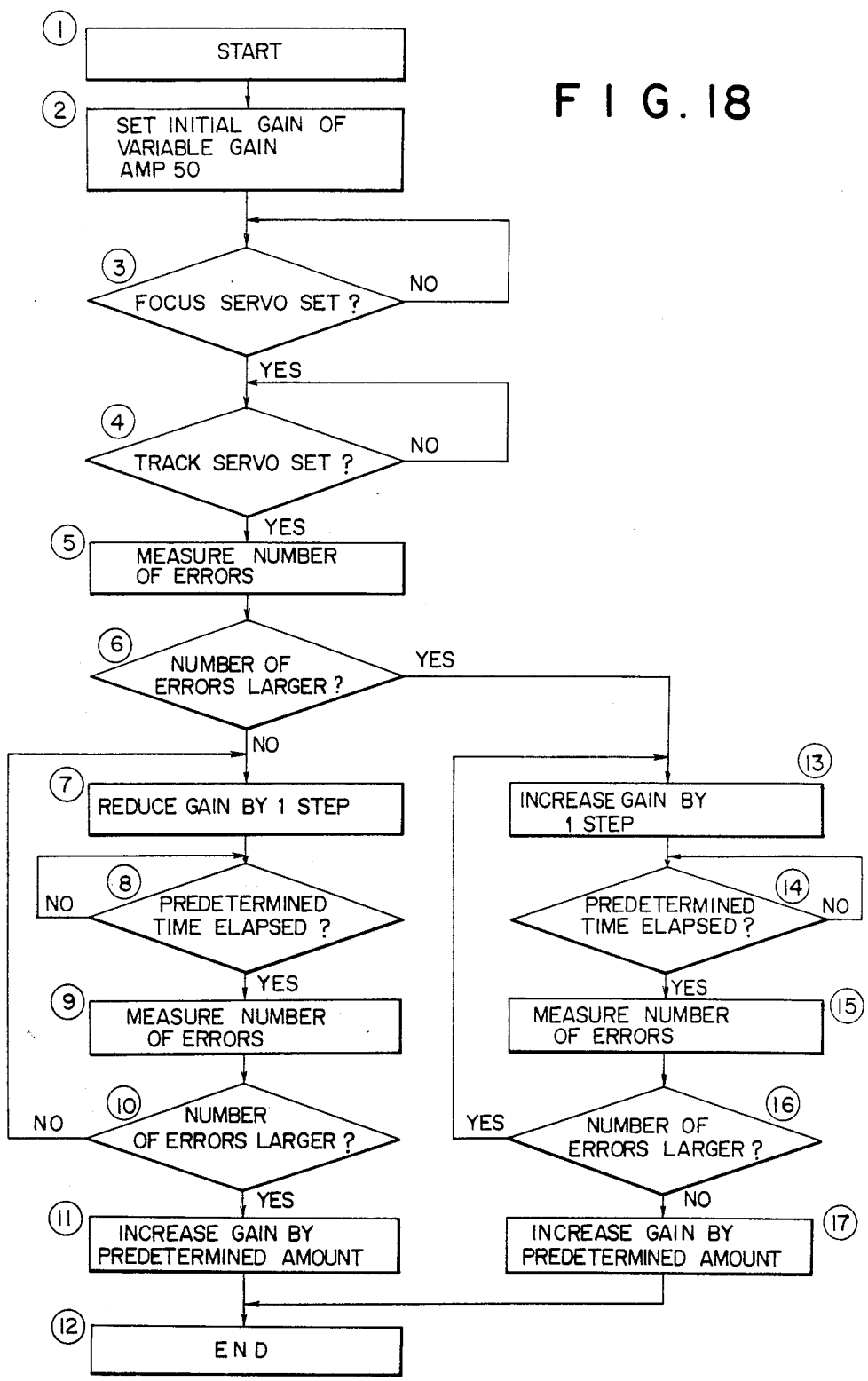
FIG. 18 is a process flow chart.

On the other hand, when a microprocessor is used as the playback condition discriminator 16, the timer 15 can be constructed by a software. The processing flow when the microprocessor is used as the playback condition discriminator 16 is shown in FIG. 18. It differs from FIG. 15 in that after the gain of the variable gain amplifier is increased or decreased by one step in the step ⑦ or ⑬, the process waits for the predetermined time (corresponding to, for example, one track revolution time) until the transient of the errors due to the instability of the servo by the change of the gain is eliminated, that is, until the servo system stabilizes to allow the correct reproduction of the digital signal, and then process goes to the ⑨ or ⑮.

Thus, in accordance with the present embodiment, since the error data of the playback condition discriminator is discriminated the predetermined time after the change of the gain of the variable gain amplifier, the miscontrol due to the instability of the servo system which occurs immediately after the change of the gain is avoided and the tracking servo circuit which can exactly control the gain, has a small actuator noise and automatically absorbs the sensitivity variation of the disc is attained.

FIG. 19 shows a sixth embodiment of the present invention. Numeral 26 denotes a driver, numeral 28 denotes a disc mount of a compact disc player and numeral 27 denotes a switch for indicating the presence or absence of a disc loaded in the disc mount 28. The like numerals to those in FIGS. 2 and 6 designate the like or equivalent elements.

In the present invention, since the loop gain is set to an optimum condition after the large number of errors condition has been detected, information such as a music signal may be partly dropped out and the playback may be interrupted if the gain is controlled during the playback of the disc.

In the present embodiment, the driver 26 for controlling the operation of the playback condition discriminator 16 is provided, and the operation of the playback condition discriminator 16 is started by the driver 26 after the loading of the disc, and the gain of the variable gain amplifier is controlled prior to the playback of the disc.

The operation is now explained with reference to a timing chart shown in FIG. 20.

The disc mount 28 has the switch 27 associated therewith to indicate the presence or absence of the loaded disc. The switch 27 sends to the driver 26 a signal "0" when the disc is not loaded and a signal "1" when the disc is loaded, as shown by D in FIG. 20. If the signal D is "1", the driver 26 sends a gain control signal E to the playback condition discriminator 16, which in turn control the gain only when the signal E is "1". The driver 26 also sends a play signal F to the digital signal processing unit 9. The play signal F is "1" when the playback is enabled, and "0" when the playback is to be stopped. Thus, the playback of the disc is inhibited during the gain control. When the disc is loaded, the playback condition discriminator 16 starts to read in the number of errors from the digital signal processing circuit 9 to change the gain of the variable gain amplifier 50 to detect the gain at which the number of errors abruptly increases as shown in FIG. 8. From this gain point, the gain is increased by the predetermined amount.

When the gain control is completed, the driver 26 responds to an end of control signal from the playback condition discriminator 16 to change the control signal to the digital signal processing circuit 9 to "1" to enable the player.

Accordingly, in the present embodiment, since the gain of the variable gain amplifier is controlled after the loading of the disc and before the start of the playback, the drop-out of the reproduced music signal due to the gain control is avoided.

The disc of the compact disc player contains main information such as music signal as well as music number, play time and control information between musics and in music. In such a disc, the number of music signals recorded and start points of the respective music signals are sometimes collectively recorded in a read-in track area as menu information.

Figure 21:
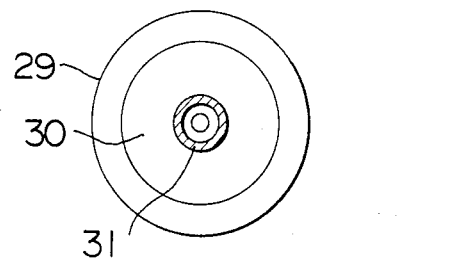
FIG. 21 shows an area of control information and an area of information other than the control information, recorded on the disc.

FIG. 21 shows a disc to illustrate the above. Numeral 29 denotes a disc, numeral 30 denotes a music signal area recorded on the disc, and numeral 31 denotes a menu information record area. For example, a music number in the menu information record area is 0 so that it is discriminated from the music signal record area.

Since the menu information is recorded in the read-in track area, it is read out at the start of the disc.

Figure 22:
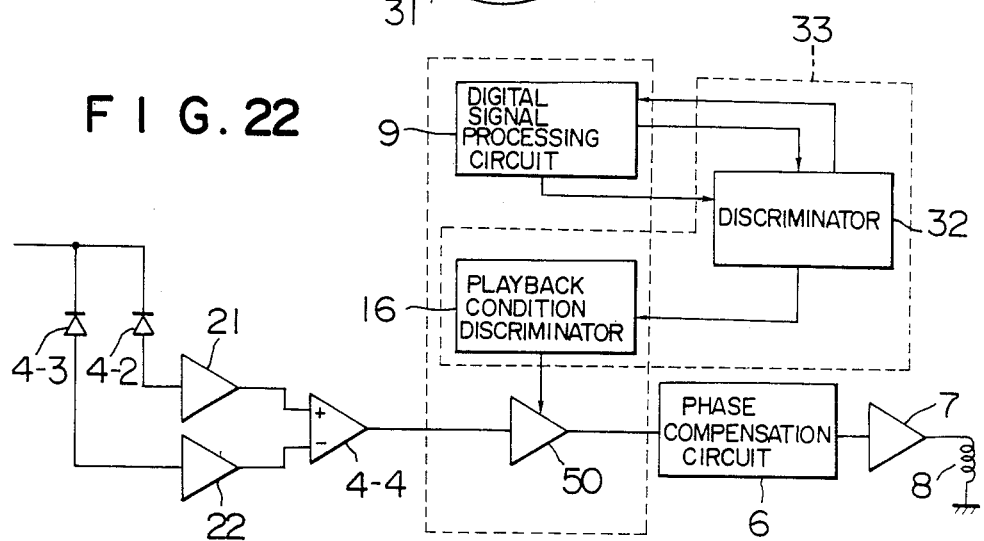
FIG. 22 is a circuit diagram of a seventh embodiment of the present invention.

A seventh embodiment of the present invention useful to a disc having such menu information recorded thereon is shown in FIG. 22. In the present embodiment, it is checked if the pickup is in the menu information record area on the disc by a discriminator 32 which discriminates the menu information from the other information, and then the gain of the variable gain amplifier 50 is controlled by the playback condition discriminator 16 based on the error data from the digital signal processing circuit 9. Like the embodiment of FIG. 19, the present embodiment enables the gain control prior to the playback of the music signal.

Figure 23:
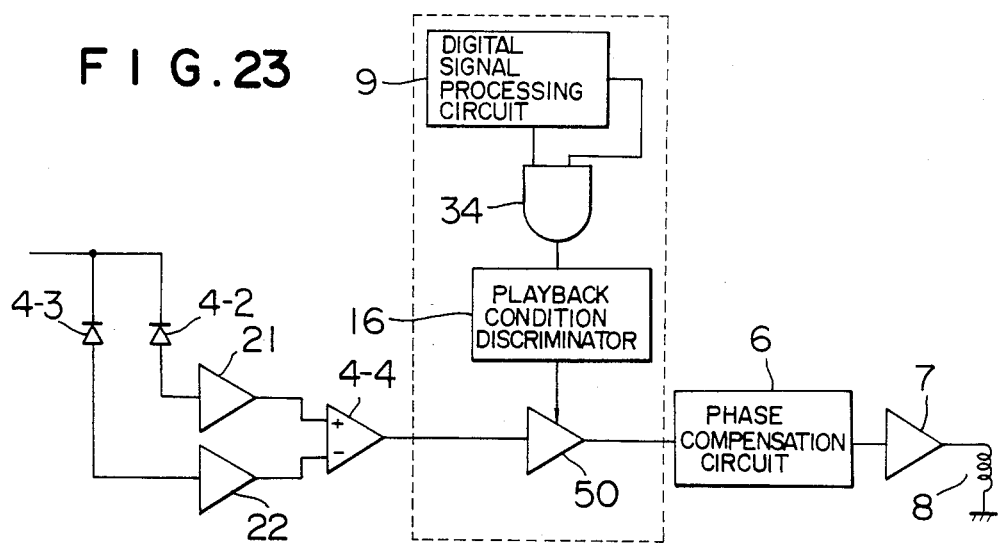
FIG. 23 is a circuit diagram of an eighth embodiment of the present invention.

FIG. 23 shows a seventh embodiment of the present invention which uses a logical gate (AND gate) 34 as the discriminator 32 of FIG. 22. Input signals to the AND gate 34 are the number of error from the digital signal processing circuit 9 and the signal indicating that the information currently reproduced is the menu information or other information. Only when the signal indicating the menu information is supplied, the number of errors is supplied to the playback condition discriminator 16, and when the signal indicating the other information is supplied, the number of errors is not supplied. As a result, the gain of the variable gain amplifier 50 is controlled by the playback condition discriminator 16 in accordance with the number of errors in the menu information read area on the disc.

When a microprocessor is used as the playback condition discriminator 16, the discriminator 32 may be constructed by a software.

Figure 24:
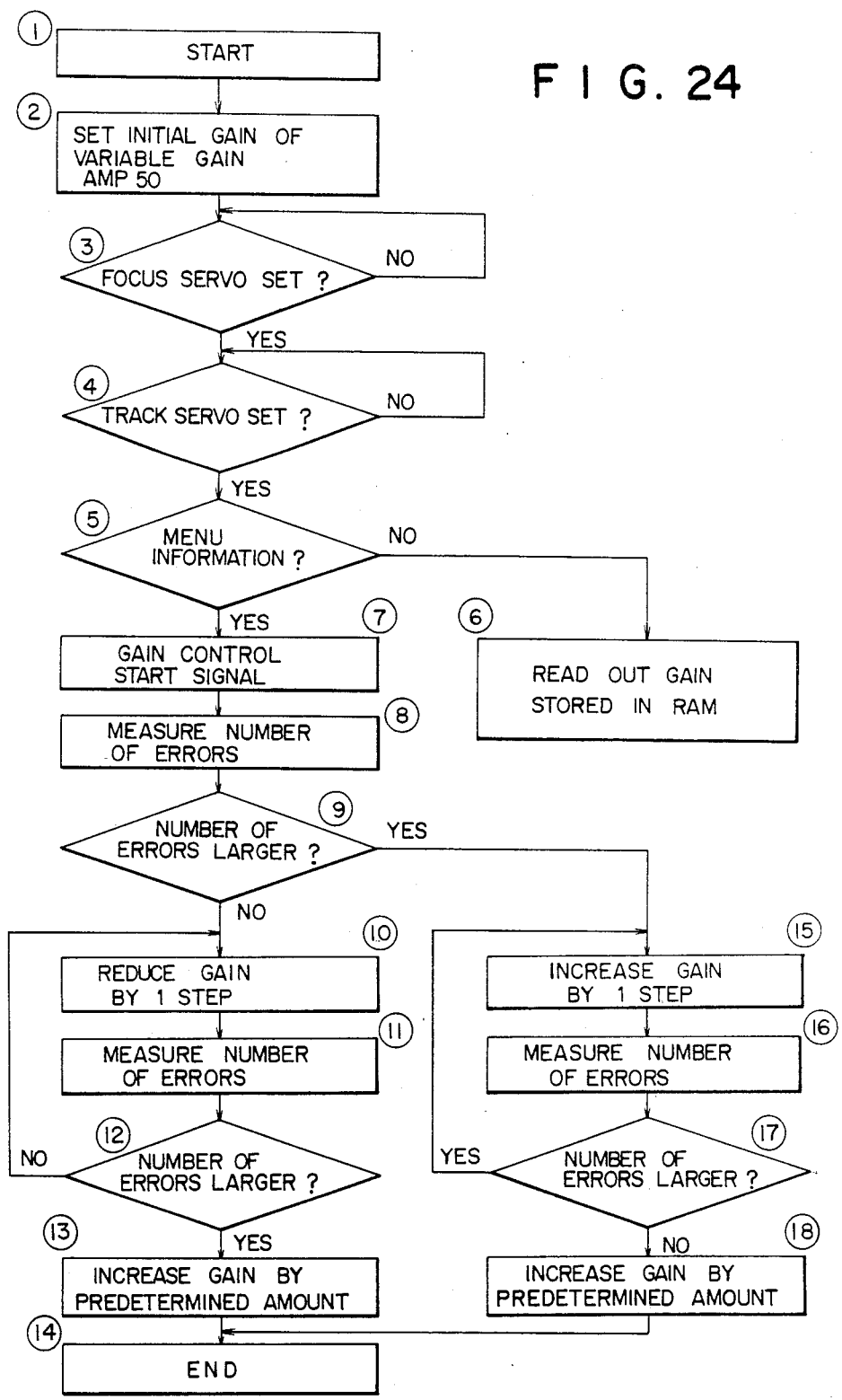
FIG. 24 is a flow chart for a microcomputer in the embodiment of FIG. 22.
Figure 25:
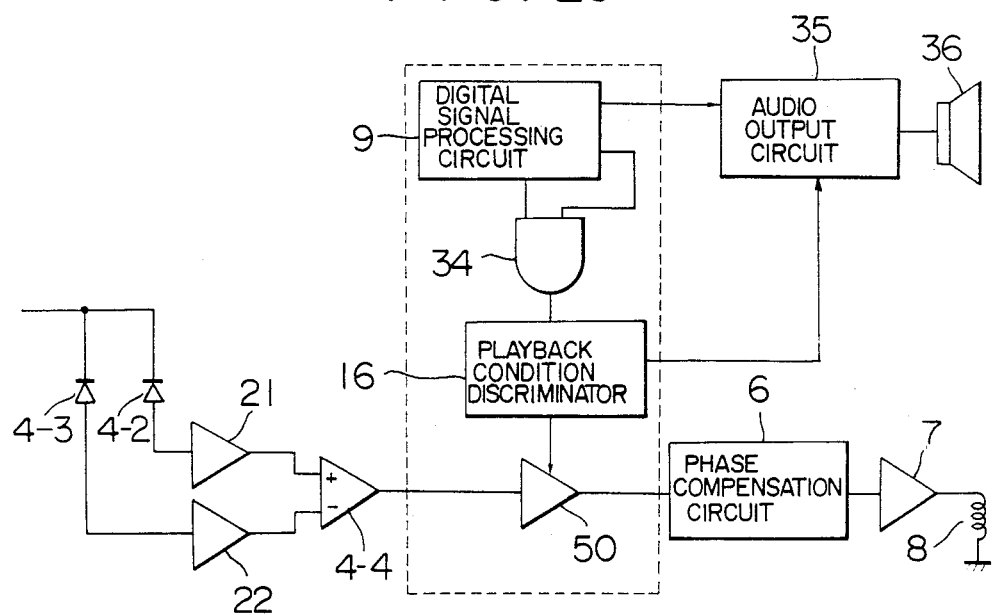
FIG. 25 is a circuit diagram of a ninth embodiment of the present invention.

The operation of the gain control when the microprocessor is used as the playback condition discriminator 16 is explained with reference to a processing flow of FIG. 24.

The microprocessor 33 comprises a ROM (read-only memory) which contains operation instructions, a CPU (central processing unit) which carries out operations in accordance with the operation instructions and a RAM (random access memory) and registers for storing data in the course of the operations.

When a power of the compact disc player is turned on in a step ①, the microprocessor 33 sets the gain of the variable gain amplifier to 0 dB and stores it in the RAM at a step ②. The setting of servo is confirmed at steps ③ and ④, and at a step ⑤, the microprocessor 33 determines if the currently reproduced signal from the digital signal processing circuit 9 in the menu information or other information, and if it is the other information, the gain data stored in the RAM is read out at a step ⑥ and the control is terminated. If the signal reproduced is the menu information, the process goes to a step ⑦. At the step ⑦, the gain control start signal is supplied to the digital signal processing circuit. In response to the gain control start signal from the microcomputer, the digital signal processing circuit continuously reproduces the menu signal until it receives a gain control end signal. At a step ⑧, the number of errors in the signal from the digital signal processing circuit is measured. The subsequent operation is same as that of FIG. 9.

In the embodiments of FIGS. 19, 22 and 23, the player is inhibited to play back during the gain control in order to prevent the sound output from being produced by the audio playback circuit. In order to more positively prevent the malfunction, a mute signal may be supplied to an audio output signal 35 from the playback condition discriminator 16 during the gain control, as shown in FIG. 24, to prevent a speaker 36 from producing a sound output.

In the above embodiment, the gain of the variable gain amplifier is controlled based on the number of errors from the digital signal processing circuit. However, the present invention is not limited thereto. For example, the same effect is obtained by detecting the level of the loop error signal voltage when the track servo loop is opened and controlling the gain of the variable gain amplifier such that the loop error signal level is kept constant.

In accordance with the present invention, since the gain control of the variable gain amplifier by the playback condition discriminator is completed prior to the playback, the drop-out of the main information (music signal) is avoided and the tracking servo circuit which has a low actuator noise and automatically absorbs the variation of the disc sensitivity is attained.

Figure 26:
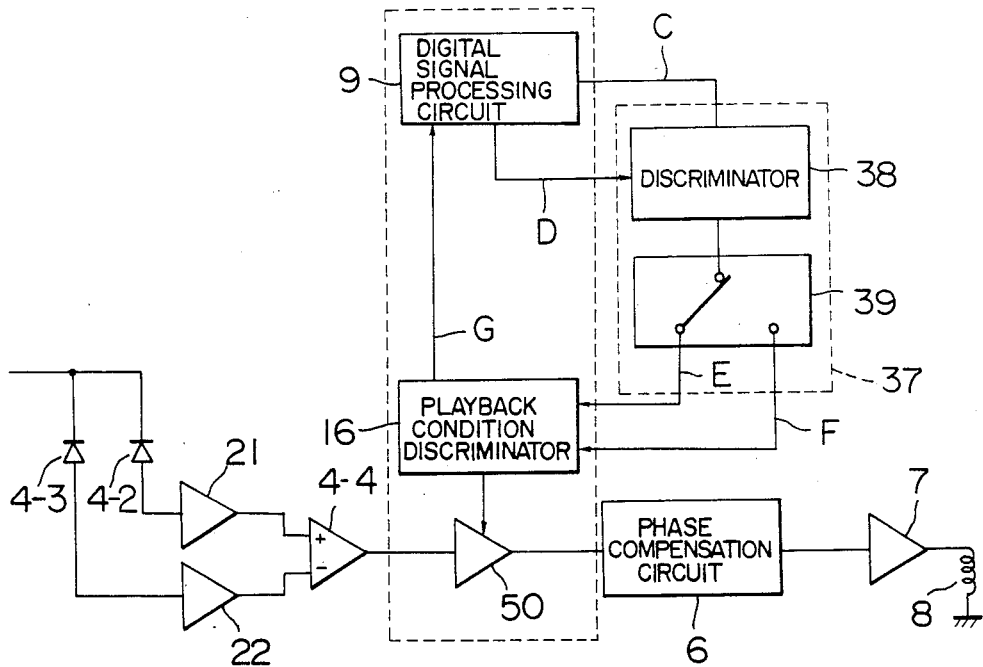
FIG. 26 is a circuit diagram of a tenth embodiment of the present invention.

FIG. 26 shows a tenth embodiment of the present invention. Numeral 37 denotes a driver for the playback condition discriminator 16, which comprises a discriminator 38 and a switching circuit 39. The like numerals to those in FIGS. 2 and 6 designate the like or equivalent elements.

In the embodiments of FIG. 19 and subsequent figures, the gain control is effected at the start of the disc prior to the playback. However, if a dirt is present on the disc, the track loop gain in lowered by the reduction of the reflection coefficient by the dirt and the number of errors may increase.

In the present embodiment, the control signal from the digital signal processing circuit 9, that is, the signal indicating whether the disc is loaded or not is discriminated by the discriminator 38, and if the disc has been loaded and the disc has been started, the switching circuit 39 is connected to a terminal E by the output of the discriminator 38 so that the gain control is effected while the digital signal processing circuit 9 is kept in non-playback mode, and after the gain control is completed, the digital signal processing circuit 9 is rendered to assume the playback mode and the switching circuit 39 is connected to a terminal F by the discriminator 38. In this manner, the gain control is effected while detecting the number of errors during the playback.

Figure 27:
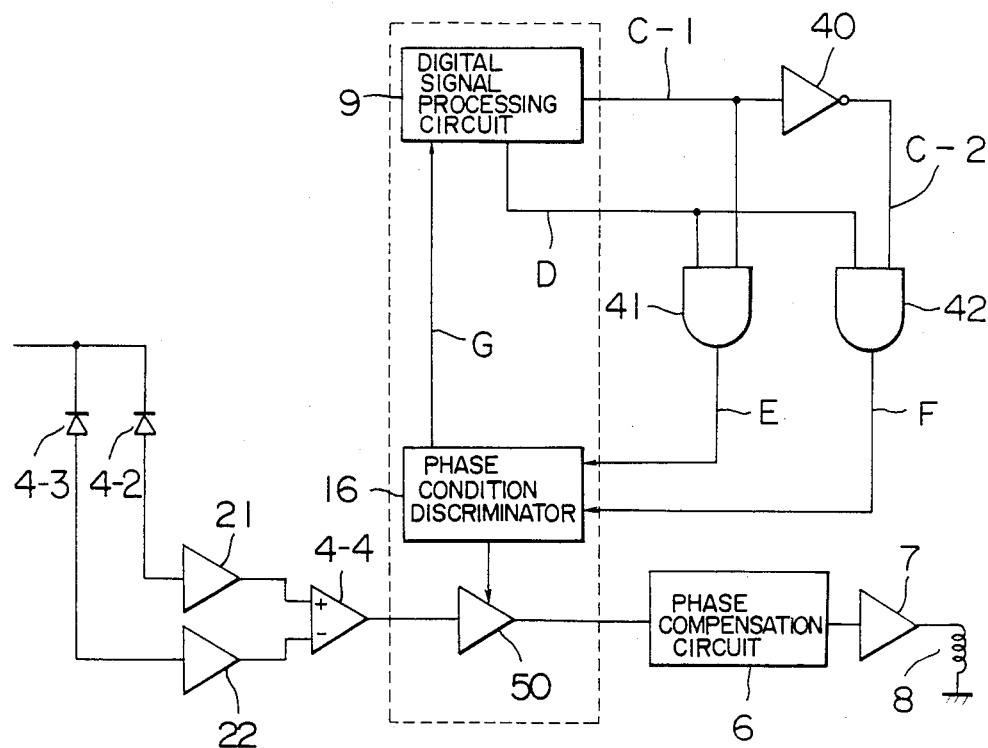
FIG. 27 is a circuit diagram of an eleventh embodiment of the present invention.

FIG. 27 shows an eleventh embodiment in which the discriminator 38 and the switching circuit 39 are constructed by logical circuits. The operation thereof is explained below.

Figure 28:
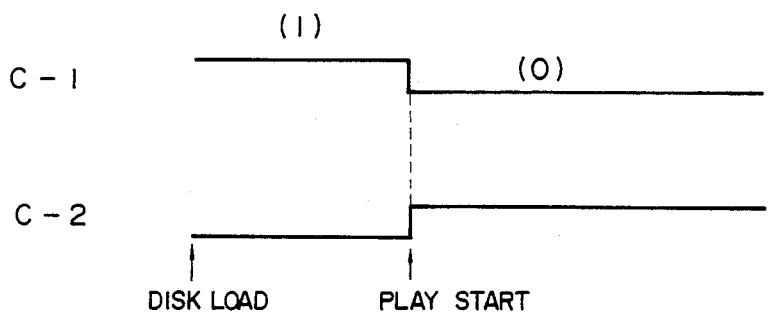
FIG. 28 illustrates a control signal.

When the disc is loaded and started, the digital signal processing circuit 9 produces a control signal C-1 shown in FIG. 28 and the number of errors D. The output of the digital signal processing circuit 9 assumes the non-playback state at the start of the disc. Since the signal C-1 is "1" and a control signal C-2 from an inverter 40 is "0", the number of errors D does not pass through an AND gate 42 but supplied to the playback condition discriminator 16 through an AND gate 41 and a line E.

When the playback condition discriminator 16 receives the number of errors D from the line E, it changes the gain of the variable gain amplifier 50 to detect a gain A which causes the number of errors in FIG. 8 to be greater than a threshold. When the gain A is detected, the gain is increased from the gain A by a predetermined amount and the gain control is terminated. Then, the playback condition discriminator 16 sends a playback start signal G to the digital signal processing circuit 9. When the digital signal processing circuit 9 receives the playback start signal G, it starts the playback of the disc and changes the control signal C-1 to "0". Thus, the control signal C-2 changes to "1" as shown in FIG. 28 and the number of errors D in the playback mode does not pass through the AND gate 41 but it is supplied to the playback condition discriminator 16 through the AND gate 42 and a line F. As a result, the playback condition discriminator 16 monitors the number of errors from the line F and when the number of errors exceeds the threshold, it increases the gain of the variable gain amplifier 50 by the predetermined amount to reduce the number of errors. Thus, in accordance with the present embodiment, the track loop gain is set to an optimum gain prior to the playback of the disc, and if the number of errors increases during the playback of the disc, the gain is increased. Accordingly, the increase of the number of errors during the playback of the disc due to the dirt of the disc is avoided and the signal with a low number of errors can be reproduced over the entire disc area.

In the embodiment of FIG. 26, the read-in of the number of errors to the playback condition discriminator 16 is switched by the switching circuit 39 to one of two lines, one for the start of the disc and the other for the playback, because the gain control at the start of the disc is two-direction control (either increase or decrease) while the gain control in the playback is one-direction control (increase) and hence the functions are to be separated. However, the present invention is not limited thereto. For example, by providing a function to discriminate the control signal from the digital signal processing circuit 9, to the playback condition discriminator 16, the switching circuit may be omitted and the circuit is simplified.

On the other hand, the driver 37 may be constructed by a software by using a microcomputer. An embodiment of the present invention which uses a microcomputer is explained with reference to a processing flow shown in FIG. 29.

The microcomputer comprises a CPU (central processing unit), a ROM (read-only memory), a RAM (random access memory), general purpose registers and a system controller.

Figure 29:
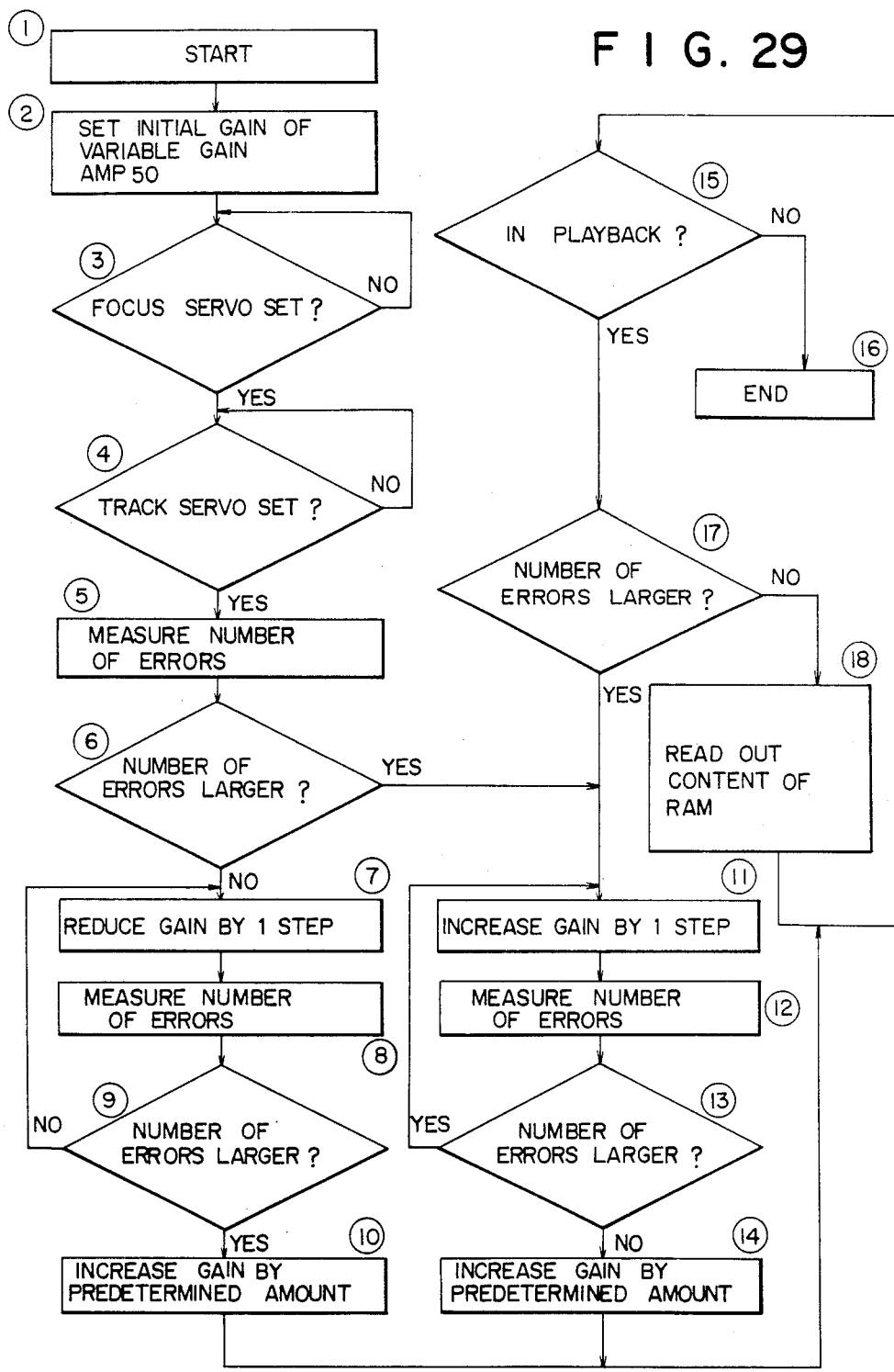
FIG. 29 is a flow chart for a microcomputer used in the present invention.

In FIG. 29, when a power of the microcomputer is turned on and the disc is loaded at a step ①, the microcomputer sets the gain of the variable gain amplifier 50 to 0 dB (initial value) and stores it in the RAM at a step ②. The setting of the servo is confirmed at steps ③ and ④ and the process goes to a step ⑤. At the step ⑤, the number of errors is measured, and it is compared with the threshold B of FIG. 8 at a step ⑥. If it is smaller than B, the gain of the variable gain amplifier 50 is decreased by one step and the updated gain is stored in the RAM at a step ⑦. The number of errors is again measured at a step ⑧. If the number of errors is smaller than B in a step ⑨, the process returns to the step ⑦, and if it is larger than B, the process goes to a step ⑩ to increase the gain of the variable gain amplifier 50 from the gain of the step ⑥ by a predetermined amount, and it is stored in the RAM. If the number of errors is larger than B at the step ⑥, the gain of the variable gain amplifier 50 is increased by one step at a step ⑪ and it is stored in the RAM. The number of errors is again measured at a step ⑫ and the number of errors is compared at a step ⑬. If the number of errors is larger than B at the step ⑬, the process returns to the step ⑪, and if it is smaller than B, the gain of the variable gain amplifier 50 is increased from the gain of the step ⑪ by the predetermined amount and it is stored in the RAM.

In this manner, the track servo loop gain is set prior to the playback to be the predetermined amount higher than the gain A at which the number of errors in FIG. 8 abruptly increases. When the gain is set prior to the playback, the process then goes to a step ⑮ to determine if the disc is in the playback mode or not. If it is not in the playback mode, the process goes to a step ⑯ and the process is terminated. If the disc is in the playback mode, the process goes to a step ⑰, and if the number of errors is larger than B, the process goes to the step ⑪ control the gain in the manner described above. If it is smaller than B, the process goes to a step ⑱ to read out the content of the RAM, and then goes to a process ⑮. In this manner, if the number of errors exceeds B during the playback, the loop gain is increased so that the disc is played back in a low error condition.

In the above embodiment, the track loop gain is controlled by the number of errors alternatively, an amplitude of the track error signal may be used in place of the number of errors to control the track loop gain.

According to the present embodiment, the tracking loop gain is set to an optimum gain prior to the playback of the disc and the number of errors is monitored during the playback, and if the number of errors increases due to the dirt or scratch, the loop gain is increased. Accordingly, the disc is played back with a low error condition over the entire area of the disc.

FIG. 30 shows a twelfth embodiment of the present invention. The like numerals to those in FIG. 1 designate the like elements, except a switching circuit 43, a switching control circuit 44 and an amplifier 45.

In the present embodiment, the loop gain of the servo circuit which operates at a minimum loop gain required for a normal operation is increased when a music is to be accessed so that the fast access is attained.

The circuit of FIG. 30 operates in a manner shown in FIG. 31. The switching control circuit 44 produces a HIGH control signal when the pickup 4 accesses at ① as shown in FIG. 31(B) to switch the switching circuit from a terminal (a) to a terminal (b) to increase the gain of the servo loop by an amount corresponding to the gain of the amplifier 45. At the end of the access (point ②), the switching control circuit 44 produces a LOW control signal to connect the switching circuit 43 to the terminal (a) so that the playback is carried out at a reduced gain.

FIG. 32 shows a thirteenth embodiment of the present invention, which is applied to the circuit of FIG. 6. The variable gain amplifier 50 in FIG. 32 is realized by the circuit shown in FIG. 10. Thus, the switching circuit 43 of FIG. 30 is not necessary to increase the gain at the access time. The switching control circuit 44 indicates whether the pickup is accessing or not. If the playback condition discriminator 16 has a function to discriminate the access condition to serve as the switching control circuit 44, the switching control circuit 44 may be necessary.

In the embodiment of FIG. 32, the gain can be varied stepwise. Therefore, fine gain control is attained during the access as well as after the access. FIG. 33 shows a time chart therefore. The access start at a point ① and the loop gain is increased and the desired area is accessed. At the end of the access (point ②), the gain is returned stepwise to the gain of the normal playback.

Since the abrupt change of the loop gain is avoided in the present embodiment, the loop-out due to the abrupt reduction of the gain after the access is avoided and the normal playback condition is smoothly recovered from the access condition.

In accordance with the present embodiment, the access is carried out rapidly and exactly by increasing the loop gain at the access time of the disc player, and the noise by the leakage of the digital signal, which occurs in the three-spot optical pickup, can be reduced by setting the loop gain in the normal playback node to the minimum gain required.

We claim:

1. A servo circuit for a signal reproducing apparatus comprising:
   an error signal detector for detecting a servo error signal used to track an information track on a record medium;
   a record information detector for reading record information recorded on said record medium;
   a variable gain amplifier;
   a circuit for feeding back an output signal of said error signal detector to an actuator through said amplifier, said actuator driving a pickup to track the information track; and
   a playback condition discriminator for discriminating a playback condition of said signal reproducing apparatus, a gain of said variable gain amplifier being controlled by an output of said playback condition discriminator;
   said record information being a digital signal recorded on said record medium, said playback condition discriminator including a number-of-errors detector for detecting the number of errors in a digital signal processing circuit having an input thereof connected to an output of said record information detector, and the gain of said variable gain amplifier being controlled in accordance with the number of errors from said number-of-errors detector.

2. A servo circuit for a signal reproducing apparatus according to claim 1, wherein said record medium is a disc and said number-of-errors detector detects the number of errors over more than one revolution of the disc.

3. A servo circuit for a signal reproducing apparatus according to claim 3, wherein said variable gain amplifier is arranged such that the gain thereof is changed by a predetermined amount at each change time, and said playback condition discriminator is arranged such that each time said playback condition discriminator changes the gain of said variable gain amplifier by said predetermined amount, said number of errors detector measures said number of errors, and said playback condition discriminator increases the gain by said predetermined amount when said playback condition discriminator has detected that the measured number of errors is larger than a predetermined number.

4. A servo circuit for a signal reproducing apparatus according to claim 3, further comprising a status discriminator for discriminating a predetermined rotation speed of a motor for rotating said record medium, wherein the gain control by said playback condition discriminator is effected after said motor has reached the predetermined rotation speed.

5. A servo circuit for a signal reproducing apparatus according to claim 4, further comprising a timer for inhibiting the detection of the number of errors by said playback condition discriminator for a predetermined time period after each change of the gain of said variable gain amplifier.

6. A servo circuit for a signal reproducing apparatus according to claim 3, further comprising a timer for inhibiting the detection of the number of errors by said playback condition discriminator for a predetermined time period after each change of the gain of said variable gain amplifier.

7. A servo circuit for a signal reproducing apparatus according to claim 1, further comprising a driver, connected to said digital signal processing circuit and said playback condition discriminator, for receiving a control signal indicating whether the record medium is loaded or not, and for controlling said digital signal processing circuit and said playback condition discriminator on the basis of said control signal such that said driver, when said control signal indicates the non-loading of the record medium, provides said playback condition discriminator with a start signal for detecting the number of errors in said digital signal processing circuit to control the gain of said variable gain amplifier and provides said digital signal processing circuit with a stop signal to stop the playback of the record medium during the control of the gain of said variable gain amplifier.

8. A servo circuit for a signal reproducing circuit according to claim 7, wherein said driver further includes means for sending the number of errors detected by said digital signal processing circuit during playback of said record medium to said playback condition discriminator, said playback condition discriminator controlling said variable gain amplifier so as to increase the gain thereof by a predetermined amount when said number of errors is detected to have increased over a predetermined number.

9. A servo circuit for a signal reproducing apparatus according to claim 1, wherein said digital signal includes a music signal and a menu information capable of being discriminated from said music signal, said menu information including a music number and play time of said music signal and being recorded in a read-in track area of said record medium, said read-in track area being subjected to read-out operation by said record information detector at the start of the record medium, and said servo circuit further comprising a discriminator for checking to see if said menu information recorded in said read-in track area is being read-out, and subsequent to the completion of the reading-out of said menu information, said playback condition discriminator controlling the gain of said variable gain amplifier on the basis of the number of errors in said digital signal processing circuit.

10. A servo circuit for a signal reproducing apparatus according to claim 9, wherein said signal reproducing apparatus includes a signal reproducing circuit provided with a muting circuit, said playback condition discriminator controlling said muting circuit so as to mute the reproduced music signal during the gain control of said variable gain amplifier.

11. A servo circuit for a signal reproducing apparatus comprising:
   an error signal detector for detecting a servo error signal used to track an information track on a record medium;
   a record information detector for reading a digital signal recorded on said record medium;
   a variable gain amplifier;

a switch;

a circuit for feeding back an output signal of said error signal detector to an actuator through said amplifier and said switch, said actuator driving a pickup to track the the information track;

a playback condition discriminator, having an input connected to an output of said variable gain amplifier so as to detect a servo error signal appearing at the output of said variable gain amplifier when said switch is in a turn-off state, for controlling the gain of said variable gain amplifier so that the amplitude of the output signal of said variable gain amplifier becomes a constant level and on the basis of said servo error signal; and a control circuit, connected to said playback condition discriminator and said switch, for turning-off said switch prior to playback of said record medium and turning on said switch after the gain of said variable gain amplifier has been controlled to be a constant level.

12. A servo circuit for a signal reproducing apparatus comprising:

an error signal detector for detecting a servo error signal used to track an information track on a record medium;

a record information detector for reading a digital signal recorded on said record medium;

a variable gain amplifier;

a switch;

a circuit for feeding back an output signal of said error signal detector to an actuator through said amplifier and said switch, said actuator driving a pickup to track the information track;

a playback condition discriminator, having an input connected to an output of said variable gain amplifier so as to detect a servo error signal appearing at the output of said variable gain amplifier when said switch is in a turn-off state, for detecting the number of errors in a digital signal processing circuit having an input thereof connected to an output of said record information detector, the gain of said variable gain amplifier being controlled in accordance with the servo error signal and the number of errors; and a control circuit, connected to said playback condition discriminator and said switch, for turning off said switch prior to playback of said record medium and turning on said switch after the gain of said variable gain amplifier has been controlled.

* * * * *